United States Patent
Gouget et al.

(10) Patent No.: US 11,870,913 B2
(45) Date of Patent: Jan. 9, 2024

(54) METHOD FOR GENERATING A DIGITAL SIGNATURE OF AN INPUT MESSAGE

(71) Applicant: THALES DIS FRANCE SAS, Meudon (FR)

(72) Inventors: Aline Gouget, Meudon (FR); Jan Vacek, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 134 days.

(21) Appl. No.: 17/437,890

(22) PCT Filed: Feb. 24, 2020

(86) PCT No.: PCT/EP2020/054776
§ 371 (c)(1),
(2) Date: Sep. 10, 2021

(87) PCT Pub. No.: WO2020/182455
PCT Pub. Date: Sep. 17, 2020

(65) Prior Publication Data
US 2022/0173914 A1    Jun. 2, 2022

(30) Foreign Application Priority Data
Mar. 14, 2019   (EP) .................................. 19305312

(51) Int. Cl.
*H04L 9/32* (2006.01)
*H04L 9/00* (2022.01)
*H04L 9/08* (2006.01)

(52) U.S. Cl.
CPC ............ *H04L 9/3252* (2013.01); *H04L 9/004* (2013.01); *H04L 9/008* (2013.01); *H04L 2209/16* (2013.01)

(58) Field of Classification Search
CPC ....... H04L 9/3252; H04L 9/004; H04L 9/008; H04L 9/085; H04L 2209/16
See application file for complete search history.

(56) References Cited

U.S. PATENT DOCUMENTS

2010/0161969 A1* 6/2010 Grebovich ............ H04L 9/3247
713/176
2012/0308001 A1* 12/2012 Arnold .................. H04L 9/0877
380/44

(Continued)

FOREIGN PATENT DOCUMENTS

EP    3379769 A1    9/2018
EP    3396892 A1    10/2018

OTHER PUBLICATIONS

Pairing-Based Cryptography—Pairing 2008, by Paterson et al., published 2008 (Year: 2008).*

(Continued)

*Primary Examiner* — Vu V Tran (57) ABSTRACT

Provided is a method for generating a digital signature of an input message (M) based on a secret key ($d_A$) of a client device having access to a first set and a second set of precomputed data stored in a storage unit. The first set of precomputed data comprises private element parts ($k_i$) protected with an homomorphic encryption. The second set of precomputed data comprises public element parts ($Q_i$) paired with the private element parts of the first set. Each private element part is a discrete logarithm of the public element part paired therewith. The private element (k), can be homomorphically encrypted, by combining homomorphically encrypted private element parts selected in the first set ($k_i$). The selection of the public and private element parts depends on the input message. Other embodiments are disclosed.

15 Claims, 2 Drawing Sheets

(56) References Cited

U.S. PATENT DOCUMENTS

2013/0051551 A1* 2/2013 El Aimani ............ H04L 9/3247
                                                  380/30
2015/0229480 A1* 8/2015 Joye ...................... H04L 9/3255
                                                  713/176
2018/0359097 A1* 12/2018 Lindell ................. H04L 9/3247

OTHER PUBLICATIONS

International Search Report (PCT/ISA/210) and Written Opinion (PCT/ISA/237) dated May 14, 2020, by the European Patent Office as the International Searching Authority for International Application No. PCT/EP2020/054776 (WO2020/182455)—[16 pages].
Thomas Pornin: "Deterministic Usage of the Digital Signature Algorithm (DSA) and Elliptic Curve Signature Algorithm (ECDSA)"—In IETF Standard, Internet Engineering Task Force>RFC 5849—Aug. 1, 2013, IETF, CH XP055545342—ISSN: 2070-1721—pp. 3,4—pp. 10-15.

* cited by examiner

METHOD FOR GENERATING A DIGITAL SIGNATURE OF AN INPUT MESSAGE

BACKGROUND

Field

The present invention relates to the field of signature schemes, and of associated cryptographic devices, and more particularly to a signature method able to securely generate a signature based on a pseudo-random number generator in a whitebox environment.

Introduction

Cryptographic algorithms are commonly used for ensuring the privacy of communications by encryption, for authentication or for generating a verifiable signature. In order to keep such authentication and signature processes secure, the secret keys used by such processes must remain secret, otherwise any attacker having knowledge of the secret key could decipher a ciphertext or generate forged signatures of a message as if he was the true owner of the secret key.

Traditionally, in order to ensure that the secret key remains secret, the decryption or signature algorithm is supposed to be executed in a secure environment only. The device executing such an algorithm is assumed trusted, preventing any attacker trying to decipher a secret message from accessing to the secret key.

However, cryptographic processes are more and more deployed in applications executed on open devices. For example many user devices now have access to the Internet, such as PCs, tablets, smartphones, and can be used for playing copyrighted digital content such as audio or video files. Such files may be cryptographically protected, for example using digital rights management (DRM), in order to make it available to a user only as long as the user has subscribed to an online multimedia streaming service.

Cryptographic processes are then executed in an environment where not all users or devices can be trusted. Such a context is usually called a white-box attack context, as the attacker may have full access to the software implementation of the cryptographic processes. Binary code of such processes is completely accessible and editable by the attacker that can analyze the binary code of the cryptography application and, for example, memory pages or registers used for temporary storage during the execution. Such manipulation may, for example, be performed using debuggers and hardware emulation tools.

In order to keep the secret key secret in a whitebox environment, various methods have been developed, such as obfuscation methods.

Even though such methods prevent an attacker from directly reading the secret key in the code binary or in the memory of the device, an attacker may still be able to retrieve part or all of the secret key, from other information leaked by the cryptographic process.

Particularly, many cryptographic process use, for generating a valid signature, a random value, called nonce, generated on the fly for each signature generation. If the generation of such a random value is not protected against reading by an attacker in a whitebox context, such an attacker may, for each generated signature, gain knowledge of the random value used to generate it. He may then deduce at least part of the secret key used for generating the signature; and then use it for generating forge signatures.

Consequently, there is a need for a method enabling a secure generation, in a whitebox environment, of a signature using a cryptographic scheme using at least one random value a.k.a. nonce, and preventing any attacker from having access to this random value, at a reasonable calculation cost.

SUMMARY

For this purpose and according to a first aspect, this invention therefore relates to a method for generating a digital signature of an input message based on a secret key of a client device having access to a first set and a second set of precomputed data stored in a storage unit, said first set of precomputed data comprising private element parts protected with an homomorphic encryption, and said second set of precomputed data comprising public element parts paired with said private element parts of the first set, each private element part being the discrete logarithm of the public element part paired therewith, said method comprising, performed by said client device:
  generating a private element, also called a nonce, homomorphically encrypted, by combining homomorphically encrypted private element parts selected in the first set,
  generating a public element by combining public element parts selected from the second set and paired with the private element parts selected in the first set,
said private element being the discrete logarithm of said public element,
  generating a first part of the digital signature from said public element,
  generating a second part of the digital signature function of the input message, the secret key, the public element and the private element,
wherein said selection of the public and private element parts depends on the input message.

Such a method enables to securely generate, in a whitebox context, a pseudo random value and a signature of the message M.

Said precomputed data may be stored in the first set and the second set in an order depending on permutations, and said permutations may be taken into account at the steps of generation of said private element and said public element such that said generated private element is the discrete logarithm of said generated public element.

By doing so, the storage order of the private element parts and of the corresponding public element parts is not the same, while still enabling using it for generating a valid signature.

In an embodiment, elliptic curve domain parameters (p, a, b, G, n, h) being p a prime number specifying the underlying field $F_p$, a and b the coefficients of the Weierstrass equation, G a base point in $E(F_p)$, n the order of G in $E(F_p)$, h the cofactor of G in $E(F_p)$:
  the private element is a random or pseudo-random number k chosen from $\{1, \ldots n\}$,
  the public element is equal to $Q=[k]G$, $[k]G$ being the scalar multiplication of the base point G by the private element k,
  the first part of the digital signature is determined from the x-coordinate of the public element Q in the elliptic curve defined by the elliptic curve domain parameters, and t being an predetermined integer:
  said private element parts protected with an homomorphic encryption are equal to $E_{skj}(k_i)$ with $1 \le i \le t$, skj being a secret homomorphic key, $E_{sk}(x)$ being a homomorphic encryption of x using a secret homomorphic key sk, said public element parts are equal to [ki]G with 1=i≤t.

The homomorphic encryption may be a DGHV (Dijik, Gentry, Halevi, Vaikuntanathan) Scheme (("Fully Homomorphic Encryption over the Integer", Dijk and al. [DGHV]) wherein the homomorphic encryption of x using secret homomorphic key sk is $E_{sk}(x)=\alpha \cdot sk+\beta*n+x$, where $\alpha,\beta$ are random number.

Using such a homomorphic scheme enables to protect the private element parts without requiring decrypting them for generating the private element by combining them.

In an embodiment, elliptic curve domain parameters (p, a, b, G, n, h) being p a prime number specifying the underlying field $F_p$, a and b the coefficients of the Weierstrass equation, G a base point in $E(F_p)$, n the order of G in $E(F_p)$, h the cofactor of G in $E(F_p)$:

the private element is a random or pseudo-random number k chosen from {1, ... n}, the public element is equal to Q=[k]G, [k]G being the scalar multiplication of the base point G by the private element k, the first part of the digital signature is determined from the x-coordinate of the public element Q in the elliptic curve defined by the elliptic curve domain parameters, and t being an determined integer:

said private element parts protected with an homomorphic encryption are equal to $E_{skj}(k_i*maskB)$ with 1≤i≤t , skj being a secret homomorphic key, maskB being a mask, * being a defined operation, and $E_{sk}(x)$ being a homomorphic encryption of x using a secret homomorphic key sk, said said public element parts are equal to [ki]G with 1≤i≤t.

Such a masking protects even more the private element, for example against second order side-channel attacks or against code skipping attacks.

In an embodiment with an ECDSA implementation:

the first part of the digital signature r is equal to $x_Q$ mod n, where $x_Q$ is the x-coordinate of the public element Q in the elliptic curve defined by the elliptic curve domain parameters, the second part of the digital signature s is equal to $k_{inv}(r \cdot d_A+H(M))$ mod n, where $k_{inv}=k^{-1}$ mod n, H(x) is the hash value of x.

In an embodiment with an ECSDSA implementation:

the first part of the digital signature r is equal to $H(x_Q\|y_Q\|M)$, where $x_Q$ and $y_Q$ are the x-coordinate and the y-coordinate of the public element Q in the elliptic curve defined by the elliptic curve domain parameters, the second part of the digital signature s is equal to: $k+r \cdot d_A$ mod n, where H(x) is the hash value of x.

According to an embodiment, m being the bit length of the input message:

the first set is an array of m pairs $(E_{sk}(k_{i,0}), E_{sk}(k_{i,1}))$ the second set is an array of m pairs $([k_{j,0}]G, [k_{j,1}]G)$, and said method according to the first aspect comprises, generating a first message part $M_A$ as a first permutation $\pi_A$ of the input message M: $M_A=\pi_A(M)$ and a second message part $M_B$ as a second permutation $\pi_B$ of the input message M: $M_B=\pi_B(M)$, selecting m values $E_{sk}(k_i)$ from the first set such that $E_{sk}(k_i)=E_{sk}(k_{i,0})$ if i-th bit of the first message part $M_A$ is 0 and $E_{sk}(k_i)=E_{sk}(k_{i,1})$ otherwise, selecting m values $[k_j]G$ from the second set such that $[k_j]=[k_{j,0}]G$ if j-th bit of the second message part $M_B$ is 0 and $[k_j]G=[k_{j,0}]G$ otherwise.

Such a method enables to select the private elements parts to be combined in a way that cannot be predicted by an attacker since it depends on the message for which a signature is generated.

In an embodiment, said second part of the digital signature generated by the client device (s) is homomorphically encrypted and the method according to the first aspect comprises: sending by the client device the generated first part and second part of the digital signature to a distant device, and decrypting homomorphically the received second part of the digital signature by the distant device.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a client device configured for generating a digital signature of an input message based on its secret key and comprising a processor, a memory and an input-output interface configured for performing the steps of the method according to the first aspect.

According to a fourth aspect, this invention therefore relates also to a system comprising a client device according to the third aspect and a distant device, said client device being configured further for sending the generated first part and second part of the digital signature to the distant device and said distant device being configured for decrypting homomorphically the received second part of the digital signature.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents, and in which.

DETAILED DESCRIPTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at solving the issue of securely generating a digital signature of an input message M based on a secret key $d_A$ in a whitebox environment using a cryptographic scheme using at least one random value, and preventing any attacker from having access to this random value, at a reasonable calculation cost.

For that purpose, the main idea of the method according to the invention is to generate such a random value by securely combining stored precomputed values from a first set of precomputed data; and to similarly generate a public element, related to the generated random value, and from which the signature may be derived, by combining precomputed values from a second set of precomputed data.

Figure 1:
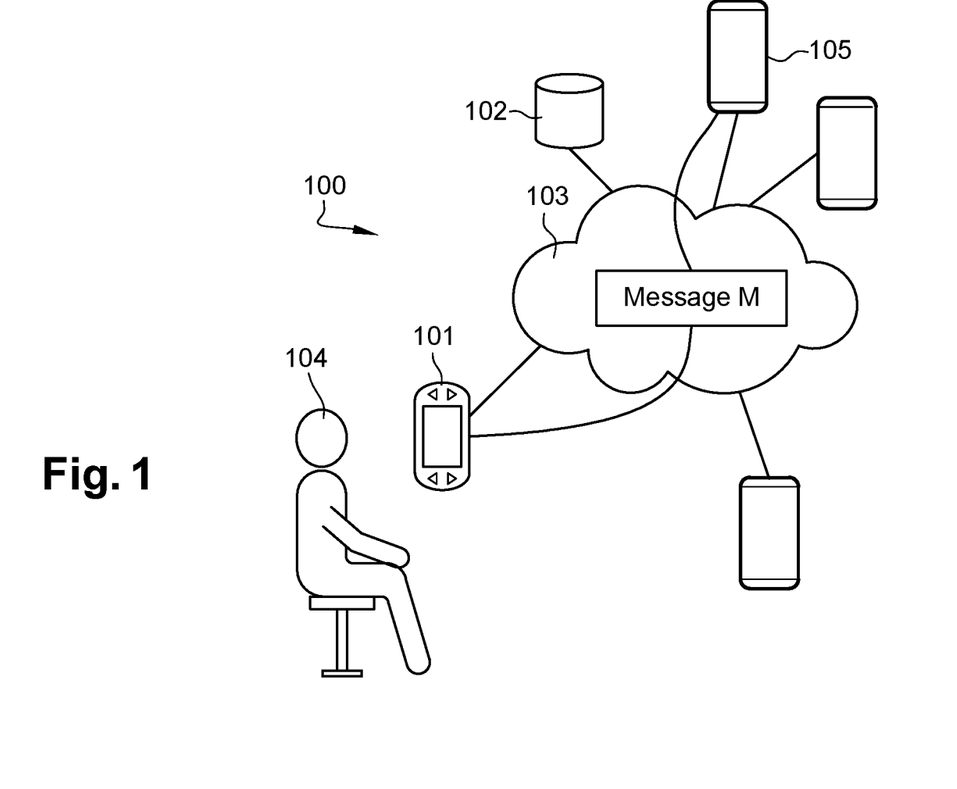
FIG. 1 is a schematic illustration of a system according to an embodiment of the present invention.

As illustrated on FIG. 1, the method according to the invention is performed by a system 100 comprising a cryptographic device 101 called client device, e.g., a mobile telephone, a tablet, or a personal computer, connected to a storage unit 102. This storage unit may be integrated in the client device. Alternatively, it may be external to it and connected to it either locally, for example through a USB interface, or remotely across a network 103, as shown on FIG. 1. The client device 101 is operated by a user 104 and may interact through the network with one or more distant server or client devices 105. The client device 101 performs cryptographic operations on behalf of the user 104 for signing messages to be sent to a distant device.

Figure 2:
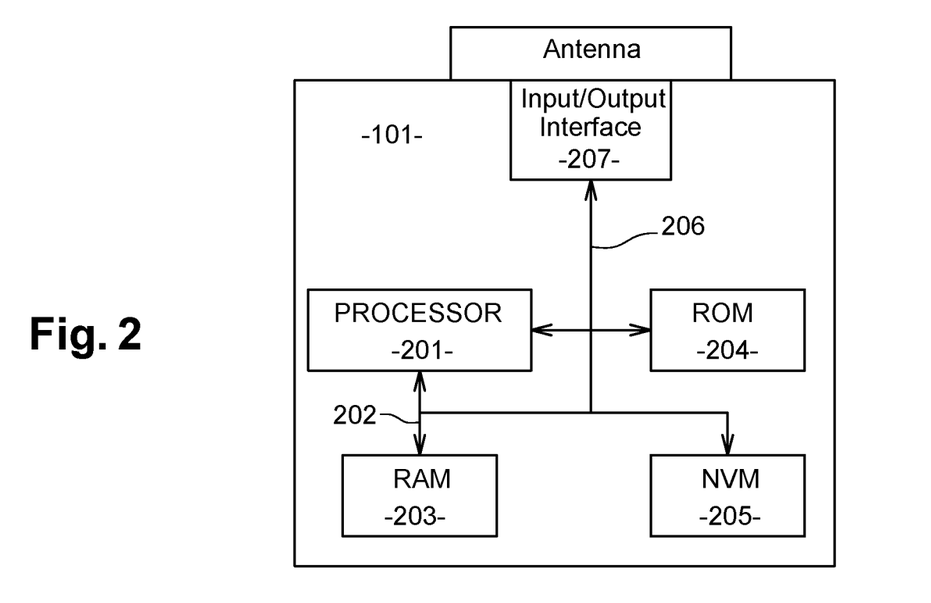
FIG. 2 is a schematic illustration of a client device according to an embodiment of the present invention.

FIG. 2 is a schematic illustration of a client device 101. The client device 101 may include a processor 201 connected via a bus 202 to a random access memory (RAM) 203, a read-only memory (ROM) 204, and/or a non-volatile memory (NVM) 205. The client device 101 further includes a connector 206 connected to the processor and by which the client device 101 may be connected to an antenna. Such an antenna may be used to connect the client device 101 to various forms of wireless networks, e.g., wide-area networks, WiFi networks, or mobile telephony networks, including the network 103. Alternatively, the client device 101 may connect to networks, including the network 103, via wired network connections such as Ethernet.

The client device may also include input/output means 207 providing interfaces to the user of the client device, such as one or more screens, loudspeakers, a mouse, tactile surfaces, a keyboard etc . . .

As described above, in order to generate, for a message to be signed M, a pseudo random private value k and a corresponding public value Q from which the signature may be derived, the client device has access to a first set and a second set of precomputed data stored in the storage unit 102.

The first set of precomputed data comprises private element parts $k_i$ with i in $\{1; \ldots ; t\}$ and t an integer.

The second set of precomputed data comprises public element parts $Q_i$ paired with the private element parts $k_i$ of the first set: each private element part is the discrete logarithm of the public element part paired therewith.

For example, in the case of a signature generation according to Schnorr signature scheme, $Q_i = g^{ki}$ with g a generator of a group G of prime order q.

In another embodiment, the signature algorithm used for generating a digital signature may be an elliptic curve based signature algorithm, such as, ECDSA (Elliptic Curve Digital Signature Algorithm), ECGDSA (Elliptic Curve German Digital Signature Algorithm), ECSDSA (Elliptic Curve Based Schnorr Digital Signature Algorithm), EC Russian DSA, Schnorr DSA, EC Full Schnorr DSA, EC-KCDSA and KC DSA. In such a case, considering elliptic curve domain parameters (p, a, b, G, n, h) with p a prime number specifying the underlying field Fp, a and b the coefficients of the Weierstrass equation, G a base point in E(Fp), n the order of G in E(Fp), h the cofactor of G in E(Fp), the public element parts are such that $Q_i = [k_i]G$, $[k_i]G$ being the scalar multiplication of the base point G by the private element part $k_i$.

As an example, from such private element parts, a private element may for example be obtained by summing up a few private element parts, with some index values, and the public element corresponding to the obtained private element may be obtained by summing up the public element parts with the same index values.

In order to prevent any reading of the private element parts $k_i$ in the storage unit by an attacker, they are protected by a homomorphic encryption. The precomputed data of the second set are not necessarily protected and may be manipulated in cleartext form.

In such a case, said private element parts protected with an homomorphic encryption may be equal to $E_{skj}(k_i)$ with $1 \leq i \leq t$, skj being a secret homomorphic key, $E_{sk}(x)$ being a homomorphic encryption of x using a secret homomorphic key sk.

In a different embodiment, the private element parts may be further secured by masking it. In such a case, the values stored in the storage unit may be the homomorphic encryption of a masked value of each private element part ki: $E_{skj}(k_i * maskB)$ with $1 \leq i \leq t$, skj being a secret homomorphic key, maskB being a mask, * being a defined operation, and $E_{sk}(x)$ being a homomorphic encryption of x using a secret homomorphic key sk.

Obfuscation techniques can be used to protect the secret homomorphic keys ski.

The homomorphic encryption may for example be a DGHV (Dijik, Gentry, Halevi, Vaikuntanathan) Scheme (("Fully Homomorphic Encryption over the Integer", Dijk and al. [DGHV]). In such a case, the homomorphic encryption of x using secret homomorphic key sk is $c = E_{sk}(x) = \alpha \cdot sk + \beta * n + x$, where $\alpha, \beta$ are random number. And the homomorphic decryption of $E_{sk}(x)$ is $x = (E_{sk}(x) \mod sk) \mod n$. In order to prevent any attacker from using the secret homomorphic keys ski to remove homomorphic encryption of the private element parts and gain knowledge of it, obfuscation techniques can be used to protect the secret homomorphic keys ski.

Homomorphic encryption enables to add and multiply encrypted values with each other, as long as the term $(\beta * n + x)$ remains smaller than sk. Indeed, given $c1 = E_{sk}(x1) = \alpha 1 \cdot sk + \beta 1 * n + x_1$ and $c2 = E_{sk}(x2) = \alpha 2 \cdot sk + \beta 2 * n + x_2$:

$$c_1 + c_2 = sk(\alpha_1 + \alpha_2) + n(\beta_1 + \beta_2) + (x_1 + x_2) = E_{sk}(x_1 + x_2)$$

$$c_1 * c_2 = sk(\alpha_1 \alpha_2 sk + n(\alpha_1 \beta_2 + \alpha_2 \beta_1) + \alpha_1 x_2 + \alpha_2 x_1) +$$
$$n(n\beta_1 \beta_2 + \beta_1 x_2 + \beta_2 x_1) + x_1 x_2 = sk \cdot \alpha_3 + n \cdot \beta_3 + x_1 x_2$$

As a result, private element parts ki may be combined into a private element part k and public element parts Qi may be combined into a public element part Q such that the private element k is the discrete logarithm of the public element Q without decrypting the private element parts ki.

In order to be able to combine multiple encrypted private element parts, they all must be encrypted using the same secret homomorphic key. As a result, the encrypted private element parts stored in the storage unit may all be encrypted using a single secret homomorphic key skj. Alternatively, different private element parts may be encrypted using different secret homomorphic keys and in that case, a key switch must be performed before combining the encrypted private element parts, such that all private element parts are encrypted with a single secret homomorphic key.

Figure 3:
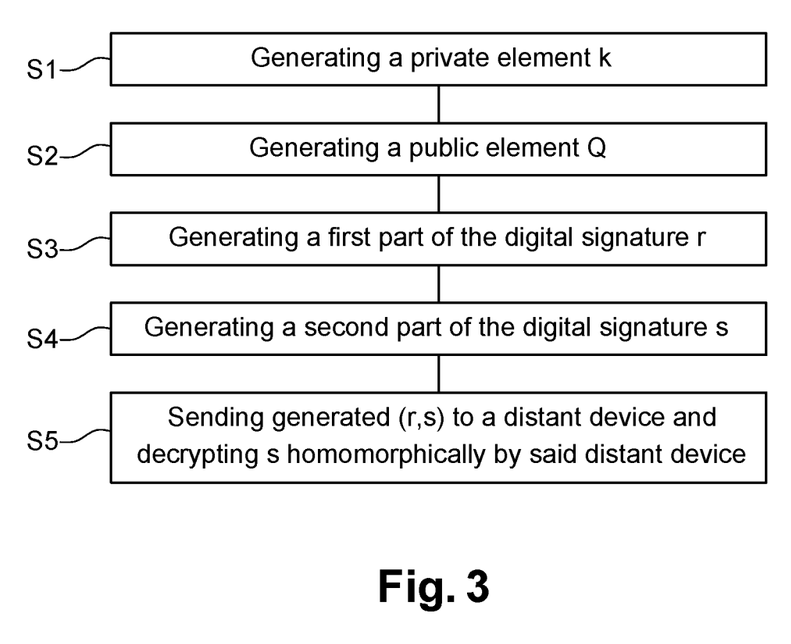
FIG. 3 illustrates schematically a method for generating a digital signature of an input message based on a secret key of a client device having access to a first set and a second set of precomputed data stored in a storage unit according to an embodiment of the present invention.

The following paragraphs describe the steps of a method for generating a digital signature of an input message M performed by the client device 101 according to a first aspect of the invention as depicted on FIG. 3.

In a first generation step S1, the processor of the client device generates a private element k, homomorphically encrypted as $c=E_{sk}(k)$, by combining homomorphically encrypted private element parts $c_i=E_{sk}(k_i)$ selected in the first set.

In a second generation step S2, the processor of the client device generates a public element Q by combining public element parts $Q_i$ selected from the second set. The public element parts $Q_i$ selected from the second set are the ones paired with the private element parts $k_i$ selected from the first set. For example $c=c_3+c_{12}+c_{56}$ and $Q=Q_3+Q_{12}+Q_{56}+=[k_3]G+[k_{12}]G+[k_{56}]G$.

By doing so, the generated private element k is the discrete logarithm of the generated public element Q.

In a third generation step S3, the processor of the client device generates a first part of the digital signature r from said public element.

When the signature algorithm is an elliptic curve based signature algorithm, the first part of the digital signature r is determined from the x-coordinate of the public element Q in the elliptic curve defined by the elliptic curve domain parameters. For example, the first part of the digital signature r may be equal to the x-coordinate of the public element Q in the elliptic curve defined by the elliptic curve domain parameters.

In a fourth generation step S4, the processor of the client device generates a second part of the digital signature s function of the input message M, the secret key $d_A$, the public element and the private element.

The selection of the public and private element parts to be combined for generating the private element and the public element depends on the input message M for which the signature is being generated.

Then, the message M and the corresponding generated signature (r,s) may be sent to a distant device by the client device. Furthermore it is assumed that the message M may also include information identifying the public key, the signature algorithm and the hash function to be used for the verification of the signature.

In another embodiment of the invention, the second part of the digital signature generated in the fourth step is still protected using homomorphic encryption. Then, it is not possible to verify the signature before the distant device removes the protection layer on the received second part of the digital signature. In this embodiment, the client device, in a fifth step S5, sends the generated signature (r,s) to a distant device and the distant device decrypts homomorphically the received second part of the digital signature.

Instead of storing the private and public element parts in the memory of the storage unit in the same order, for example from i=1 to i=t, the precomputed data may be stored in the first set and the second set in an order depending on permutations: a permutation TrA may be applied to $\{k_1, \ldots, k_t\}$ before storing the private element parts and another permutation TrB may be applied to $\{Q_1, \ldots, Q_t\}$ before storing the public element parts. In such a case, these permutations are taken into account at the first and second generation steps when selecting the public and private element parts and generating said private element and said public element such that said generated private element is the discrete logarithm of said generated public element. The public element parts Qi selected in the second set for combining into the public element Q must always be the public element pairs paired with the private element parts selected in the first set for generating the private element.

Two implementations with two different cryptographic schemes are detailed here below for illustrative purposes.

In the first example, the cryptographic algorithm to be used is an Elliptic Curve Digital Signature Algorithm (ECDSA).

In this first implementation, the generated first part of the digital signature r is equal to $x_Q$ mod n and the generated second part of the digital signature s is equal to $k_{inv}(r \cdot d_A + H(M))$ mod n, where $x_Q$ is the x-coordinate of the public element Q in the elliptic curve, $k_{inv}=k^{-1}$ mod n and H(x) is the hash value of x.

The homomorphically encrypted value of $k_{inv}$ may be computed as a homomorphic combination of the selected data from the first set of precomputed data (DataSetA) of the form $E_{skj}(ki)$.

The computation of the first part of the digital signature r may be done independently from the computation of the value $k_{inv}$ by using a combination of data selected from the second set of precomputed data (DataSetB) of the form [ki]G.

An implicit checksum of the private element k is done at the fourth generation step S4 when r and kine are combined with the secret key $d_A$ to provide the second part of the digital signature s.

In the second example, the cryptographic algorithm to be used is the Elliptic Curve Based Schnorr Digital Signature Algorithm (ECSDSA).

In this second implementation, the generated first part of the digital signature r is equal to $H(x_Q \| y_Q \| M)$ and the generated second part of the digital signature s is equal to: $k+r \cdot d_A$ mod n, where $x_Q$ and $y_Q$ are the x-coordinate and the y-coordinate of the public element Q in the elliptic curve, $\|$ the concatenation operation and H(x) is the hash value of x.

The computation of the first part of the digital signature r may be done independently from the computation of the private value k using a combination of selected data selected from the second set of precomputed data (DataSetB) of the form [ki]G.

An implicit checksum of the nonce k is done at the fourth generation step S4 when r and k are combined with the secret key $d_A$ to provide the second part of the digital signature s.

An advantage of both examples that the attacker has to understand the whitebox countermeasure in order to defeat it. A fault attack requires to perform modifications at two different locations for keeping consistency of the checksum related to the value k. Otherwise, the second part of the digital signature s will be wrong.

The selection of the public and private element parts for generating the private element and the public element depends on the input message.

A first example to illustrate such a selection according to the invention using simple homomorphic additions in an ECDSA implementation is given here below.

Let $\pi_A = \pi_B$ = Identity.

The first set of precomputed data (DataSetA) comprises private element parts $\{k_1, \ldots k_{512}\}$ protected with an DGHV homomorphic encryption:

$c_1 = \alpha_1 * sk + \beta_1 * n + k_1$ $c_2 = \alpha_2 * sk + \beta_2 * n + k_2$

...

$c_{512} = \alpha_{512} * sk + \beta_{512} * n + k_{512}$

The second set of precomputed data (DataSetB) comprises the public element parts:

$[k_1]G$ $[k_2]G$

...

$[k_{512}]G$

The selection of the public and private element parts for generating the public and private elements is based on some indexes of message to be signed: 3, 12, 56 for example.

The private element homomorphically encrypted is generated by computing: $k_{encrypted} = c_3 + c_{12} + c_{56}$.

The public element is generated by computing: $Q=[k]G = [k_3]G+[k_{12}]G+[k_{56}]G$.

Then the first part of the digital signature r is generated equal to $x_Q$ mod n and the second part of the digital signature s is generated equal to $k_{inv}(r \cdot d_A + H(M))$ mod n.

The encrypted value kine may be computed as a homomorphic combination of selected stored data from the first set of precomputed data (DataSetA) of the form $E_{skj}$ (ki).

A second example to illustrate such a selection according to the invention using permutations $\pi_A$ and $\pi_B$ different from identity in an ECDSA implementation is given here below.

If $\pi_A$ and $\pi_B$ are two different permutations such a selection of precomputed data has to be consistent for both types of data. It means that ordering of the first set (DataSetA) and the second set (DataSetB) has to correspond to the choices of $\pi_A$ and $\pi_B$.

In this case, said permutations are taken in account at the steps of generation of said private element and said public element such that said generated private element is the discrete logarithm of said generated public element In this second example, m being the bit length of the input message M, the first set (DataSetA) is an array of m pairs $(E_{sk}(k_{i,0}), E_{sk}(k_{i,1}))$ and the second set (DataSetB) is an array of m pairs $([k_{j,0}]G, [k_{j,1}]G)$, Moreover the method according to the first aspect comprises the following steps for performing such a selection:
generating a first message part $M_A$ as a first permutation $\pi_A$ of the input message M: $M_A = \pi_A(M)$ and a second message part $M_B$ as a second permutation $\pi_B$ of the input message M: $M_B = \pi_B(M)$, selecting m values $E_{sk}(k_i)$ from the first set such that $E_{sk}(k_i) = E_{sk}(k_{i,0})$ if i-th bit of the first message part $M_A$ is 0 and $E_{sk}(k_i) = E_{sk}(k_{i,1})$ otherwise,
selecting m values $[k_j]G$ from the second set such that $[k_j]G = [k_{j,0}]G$ if j-th bit of the second message part $M_B$ is 0 and $[k_j]G = [k_{j,0}]G$ otherwise.

Then, the other steps S1 to S4 are performed as described here above.

According to a second aspect, the invention is also related to a computer program product directly loadable into the memory of at least one computer, comprising software code instructions for performing the steps of the method according to the first aspect as described above when said product is run on the computer.

According to a third aspect, the invention is also related to a client device 101 configured for generating a digital signature of an input message M based on its secret key $d_A$ and comprising a processor 201, a memory 203, 204, 205 and an input-output interface 207 configured for performing the steps of the method according to the first aspect as described here above.

As a result, a pseudo-random value may be generated and the signature of a message may be generated based on this random value in a way that resist first-order attacks in a whitebox context.

What is claimed is:

1. A method comprisinq steps executing on a client device for generating a digital signature of an input message (M) based on a secret key ($d_A$) of a client device having access to a first set and a second set of precomputed data stored in a storage unit,
said first set of precomputed data comprising private element parts ($k_i$) protected with an homomorphic encryption,
and said second set of precomputed data comprising public element parts ($Q_i$) paired with said private element parts ($k_j$) of the first set,
each private element part being a discrete logarithm of the public element part paired therewith,
said method comprising said steps below, performed by said client device:
generating (S1) a private element (k), homomorphically encrypted, by combining homomorphically encrypted private element parts ($k_j$) selected in the first set;
generating (S2) a public element (Q) by combining the public element parts ($Q_i$) selected from the second set and paired with the private element parts ($k_j$) selected in the first set, said private element being the discrete logarithm of said public element;
generating (S3) a first part of the digital signature (r) from said public element; and
generating (S4) a second part of the digital signature (s) function of the input message (M), the secret key ($d_A$), the public element and the private element, wherein said selection of the public and private element parts depends on the input message.

2. The method of claim 1, wherein said precomputed data are stored in the first set and the second set in an order depending on permutations, and wherein said permutations are taken into account at the steps of generation of said private element and said public element such that said generated private element is the discrete logarithm of said generated public element.

3. The method of claim 1, where an elliptic curve for generating said digitial signature is defined by elliptic curve domain parameters (p,a, b, G, n, h) with p a prime number specifying an underlying field $F_p$, a and b the coefficients of a Weierstrass equation, G a base point in $E(F_p)$, n the order of G in $E(F_p)$, h the cofactor of G in $E(F_p)$,
wherein:
the private element is a random or pseudo-random number k chosen from $\{1, \ldots n\}$,
the public element is equal to $Q=[k]G$, $[k]G$ being the scalar multiplication of the base point G by the private element k,
the first part of the digital signature (r) is determined from the x-coordinate of the public element Q in the elliptic curve defined by the elliptic curve domain parameters, and wherein, t being an predetermined integer:
said private element parts protected with an homomorphic encryption are equal to $E_{ski}(k_i)$ with $1 \leq i \leq t$, skj being a secret homomorphic key, $E_{ak}(x)$ being a homomorphic encryption of x using a secret homomorphic key sk, and said public element parts are equal to $[ki]G$ with $1 \leq i \leq t$.

4. The method of claim 3, wherein the homomorphic encryption is a DGHV (Dijik, Gentry, Halevi, Vaikuntanathan) Scheme that is fully homomorphic encryption over said predetermined integer], and wherein the homomorphic encryption of said x using said secret homomorphic key sk is $E_{sk}(x)=a \cdot sk+\beta*n+x$, where $\alpha, \beta$ are random numbers.

5. The method of claim 3,
wherein, t is instead a determined integer with:
said private element parts protected with an homomorphic encryption are equal to $E_{skj}(k_i*maskB)$ with $1 \leq i \leq t$, skj being a secret homomorphic key, maskB being a mask, * being a defined operation, and $E_{sk}(x)$ being a homomorphic encryption of x using a secret homomorphic key sk, and
said said public element parts are equal to $[ki]G$ with $1 \leq i \leq t$.

6. The method of claim 3 wherein:
the first part of the digital signature r is equal to $x_Q$ mod n, where $x_Q$ is the x-coordinate of the public element Q in the elliptic curve defined by the elliptic curve domain parameters, and
the second part of the digital signature s is equal to $k_{inv}(r \cdot d_A+H(M))$ mod n, where $k_{inv}=k^{-1}$ mod n and $H(x)$ is the hash value of x.

7. The method of claim 3 wherein:
the first part of the digital signature r is equal to $H(x_Q\|y_Q\|M)$, where $x_Q$ and $y_Q$ are the x-coordinate and the y-coordinate of the public element Q in the elliptic curve defined by the elliptic curve domain parameters, and
the second part of the digital signature s is equal to $k+r \cdot d_A$ mod n, where $H(x)$ is the hash value of x.

8. The method of claim 3,
wherein, for m being a bit length of the input message M:
the first set (DataSetA) is an array of m pairs $(E_{sk}(k_{i,0})\,E_{sk}(k_{i,1}))$, and
the second set (DataSetB) is an array of m pairs $([k_{i,0}]G[k_{j,1}]G)$,
said method comprising,
generating a first message part $M_A$ as a first permutation $\pi_A$ of the input message M: $M_A=\pi_A(M)$ and a second message part $M_A$ as a second permutation a of the input message $M_B=\pi_B(M)M_B=\pi_E$; and
selecting m values $[k_i]$ from the first set such that $E_{zk}(k_i)=E_{sk}(k_{i,0})$ if i-th bit of the first message part $M_A$ is 0 and $E_{sk}(k_i)=E_{sk}(k_{i,1})$ otherwise,
selecting m values $[k_j]G$ from the second set such that $[k_j]G=[k_{j,0}]G$ if j-th bit of the second message part $M_E$ is 0 and $[k_j]G=[k_{j,0}]G$.

9. The method of claim 1, further comprising:
sending, by the client device, the first part that was generated and the second part that was generated, (r,s), of the digital signature to a distant device, and
decrypting homomorphically the second part of the digital signature received by the distant device
wherein said second part of the digital signature generated by the client device (s) is homomorphically encrypted.

10. A client device comprising:
a processor to generate a digital signature of an input message (M) based on a secret key ($d_A$), and
a memory for temporary storage of a first set and a second set of precomputed data during an execution of said processor,
wherein said processor:
generates (S1) a private element (k), homomorphically encrypted, by combining homomorphically encrypted private element parts selected in the first set ($k_i$);
generates (S2) a public element (Q) by combining public element parts (Qi) selected from the second set and paired with the private element parts selected in the first set;
generates (S3) a first part of the digital signature (r) from said public element; and
generates (S4) a second part of the digital signature of the input message (M), the secret key ($d_A$), the public element and the private element,
wherein said private element is a discrete logarithm of said public element,
wherein said selection of the public and private element parts depends on the input message.

11. The client device of claim 10, wherein the memory stores:
said first set of precomputed data comprising private element parts (ki) protected with an homomorphic encryption; and
said second set of precomputed data comprising public element parts (Qi) paired with said private element parts of the first set.

12. The client device of claim 11, where instead of storing the private and public element parts in the memory in a same order, the processor stores said precomputed data to the memory in the first set and the second set in an order depending on permutations.

13. The client device of claim 10, wherein said processor performs the steps of generating S1, S2, S3 and S4 by way of software code instructions stored in said memory and loaded into the processor for execution.

14. A system comprising:
a client device; and
a distant device,
wherein said client device sends a first part and a second part of a digital signature it generates to the distant device, by way of
a processor to generate a digital signature of an input message (M) based on a secret key ($d_A$), and
a memory for temporary storage of a first set and a second set of precomputed data during an execution of said processor, wherein said processor:
generates (S1) a private element (k), homomorphically encrypted, by combining homomorphically encrypted private element parts selected in the first set (ki);
generates (S2) a public element (Q) by combining public element parts (Qi) selected from the second set and paired with the private element parts selected in the first set;
generates (S3) a first part of the digital signature (r) from said public element; and
generates (S4) a second part of the digital signature of the input message (M), the secret key ($d_A$), the public element and the private element,
wherein said selection of the public and private element parts depends on the input message.

15. The system of claim 14 wherein:
said distant device decrypts homomorphically the second part of the digital signature received from the client device,
wherein said private element is a discrete logarithm of said public element.

\* \* \* \* \*